Figure 1:
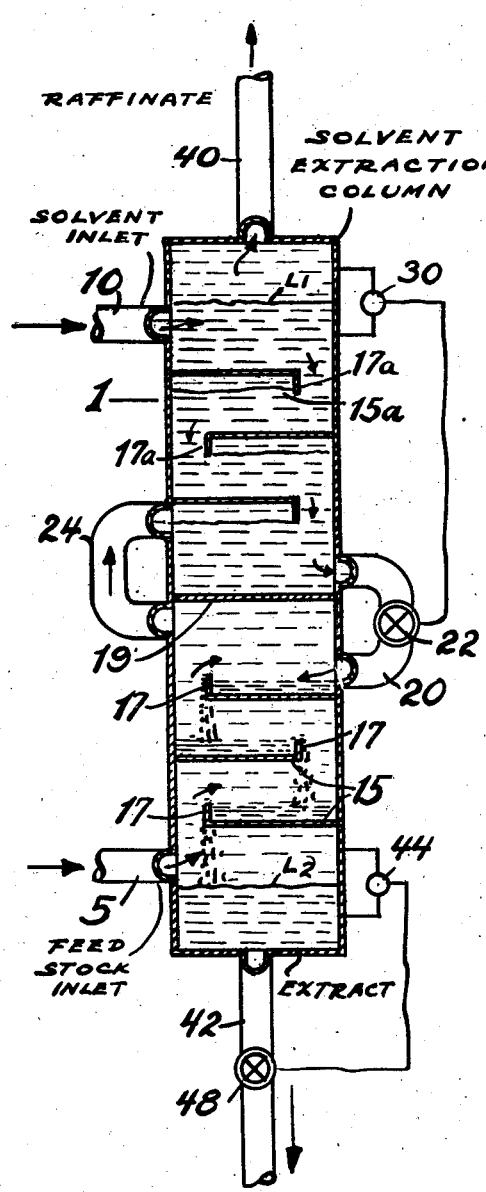
Figure 2:
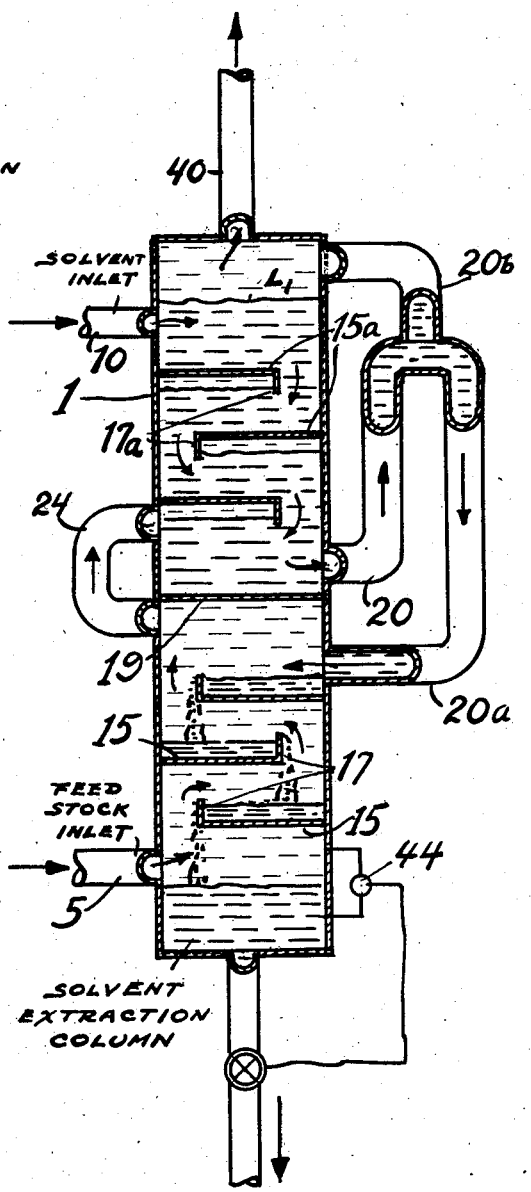

May 14, 1946.  D. E. STINES  2,400,378
EXTRACTION METHOD
Filed June 5, 1943

Daniel E. Stines Inventor
By P. H. Young Attorney

Patented May 14, 1946

2,400,378

UNITED STATES PATENT OFFICE 2,400,378

EXTRACTION METHOD

Daniel E. Stines, Plainfield, N. J., assignor to Standard Oil Development Company, a corporation of Delaware Application June 5, 1943, Serial No. 489,779

5 Claims. (Cl. 196—13)

The present invention relates to methods of separating by means of a selective solvent, a mixture of liquid components into desired fractions and, more particularly, it relates to a liquid-liquid extraction process in which a mixture of liquid components may be solvent extracted to separate and recover valuable components from the mixture, or to improve the original mixture by removing certain undesired components therefrom.

Prior to my invention numerous processes were available for treating industrial products in types of operations which may be generally referred to as solvent extraction methods. Thus, for example, Coastal and Mid-Continent oils have heretofore been treated with solvent such as $SO_2$, or a mixture of solvents, in order to produce a lubricating oil of improved properties including viscosity index, carbon content, and the like. Also, in entirely different arts, solvent extraction has become important as, for example, in the synthetic rubber industry where various solvent methods have been devised for separating say butadiene, from other hydrocarbons of paraffinic or olefinic nature which boil in close proximity to butadiene and cannot be separated therefrom by distillation.

My present invention is directed broadly to the concept of fractionating liquids by selective solvent action, in particular where two normally immiscible or partly miscible liquid materials are contacted. For example, the invention is applicable in such processes as liquid $SO_2$ treatment of lubricating oils to remove undesired components, liquid phase extraction of $H_2S$ from liquid hydrocarbon streams, liquid phase extraction of butadiene from liquid $C_4$ streams, and the like. It is the aim of my present invention to increase the efficiency of such processes.

In the prior art there are solvent treating processes involving the so-called "split phase," i. e., maintaining an interface of the heavier phase in the central portion of the extraction column. In this type of process, the lighter liquid is fed to the bottom of a vertical extraction tower while the heavier liquid is fed to the top of the tower. The liquids flow countercurrently through the tower. In the bottom of the tower, the lighter liquid is dispersed in the heavier liquid and in the top section of the tower the heavier liquid is dispersed in the lighter liquid. As indicated in the middle of the tower there is an interface of the heavier phase.

In my present process, I reverse the foregoing procedure by controlling conditions so that the heavier liquid is dispersed in the lighter liquid in the bottom section of the tower while in the top section of the tower, the lighter liquid is dispersed in the heavier liquid. I have found that this method gives better results.

One object of my present invention is to solvent treat a liquid mixture of a plurality of components with a liquid solvent to remove undesired components under conditions obtaining for maximum efficiency.

A more specific object of my invention is to provide means for solvent extracting hydrocarbon oil, such as lubricating oils, under conditions which will result in improvement of the raffinate and permit the use of less solvent, for a given number of actual extraction stages, than would be required with single phase operation or by the so-called "split phase" operation.

Other and further objects of my invention will appear from the following more detailed description and claims.

In the accompanying drawing, I have shown in Fig. I, in vertical section an apparatus in which one modification of my invention may be carried into practical effect, and in Fig. II, I have shown a further modification representing a second preferred embodiment of the said invention. In the views, similar reference characters refer to similar parts.

Referring in detail to the drawing 1 represents in either Fig I or II a solvent extraction column, divided into an upper and lower separated section by means of partition plate 19, and in which means are provided for contacting two immiscible or only partly miscible liquids as where, for example, lubricating oil is caused to flow in countercurrent flow to a selective liquid solvent for certain components of the oil, such as liquid $SO_2$. The lubricating oil, in the example I have chosen to illustrate my invention, to be treated representing the feed stock stream containing components which are removable by, or selectively soluble in the $SO_2$, is introduced into the bottom of the tower through inlet pipe 5 and thereafter flows upwardly against the downflowing $SO_2$, introduced at near the top of the tower through inlet pipe 10. In the method illustrated in Fig. I, reversal of the phases is accomplished as follows: In the upper section, above plate 19, the solvent is the continuous phase, while in the lower section the hydrocarbon is the continuous phase, and I achieve phase reversal of the liquids moving countercurrently, across partition plate 19, in the tower, by controlling the rate of withdrawal of the solvent from the upper section of the tower through pipe 20 into the lower section, coupled with controlling the rate of withdrawal of solvent from the bottom of the tower through draw-off pipe 42. The flow rate of liquid in pipe 20 is controlled by valve 22 responsive to liquid level control device 30 and the level $L_2$ of the extract at the bottom of the lower section is controlled by valve 43 operating in response to level control mechanism 44. Thus, the hydrocarbons entering at 5 in Fig. I become the continuous phase in the section of the tower below plate 19, flow countercurrently upward against the downflowing solvent and enter the upper section through pipe 24. In the upper section the hydrocarbon becomes the disperse phase. In the upper section the hydrocarbons pass mostly through the perforations of pierced plates 15a while in the lower section the dispersed solvent flows through the perforations of pierced plates 15. To build up a static pressure of the solvent in the lower section, I provide the plates 15 with dams 17. In the upper section projections 17a are turned downwardly. In Fig. I, the arrows, therefore, indicate, in the upper section the flow of solvent i. e. $SO_2$, while they indicate the flow of hydrocarbon in the lower section.

In Fig. II, the same phase reversal takes place, i. e., the hydrocarbons entering at 5 form the continuous phase below plate 19 while above 19, the heavier solvent phase is the continuous phase. In this modification, I achieve phase reversal across plate 19, by hydraulic means. To this end, liquid flows from the upper section through 20 and 20a forming together a U bend, into the lower section of the column I and following this flow the solvent is discharged as the dispersed phase into the continuous hydrocarbon phase. A connection 20b serves to prevent a siphoning effect. Except as indicated, the operation of the device of Fig. II, is the same as that of Fig. I. In both figures, raffinate is recovered through line 40 and this raffinate may be treated to remove solvent in known manner and otherwise refined. For simplicity and in the interest of clarity, I have limited the showing in the drawing to the heart of the invention, omitting conventional after-treating steps.

While I have disclosed two methods of obtaining phase reversal, other equivalent methods may be used and I wish to reiterate that my invention resides in causing in a liquid-liquid contacting operation employing liquids which are of different densities and are immiscible or only partly miscible, to operate in such a manner that the lighter or lower density liquid is the continuous phase in the lower portion of a vertical extraction column while the lighter or lower density liquid is dispersed in the heavier liquid forming the continuous phase, in the upper part of the said tower, there being therefore a phase reversal at an intermediate point in said tower.

In Fig. I, I have previously indicated automatic mechanism for controlling the liquid level $L_1$ in the upper section of tower I and $L_2$ which is the level of the accumulated solvent in the bottom of the tower. A mechanism for controlling the rate of liquid withdrawal suitable for use here is the so-called "duo-gravity type" liquid level control device, a device whose structure and mode of operation is well known to the art.

The advantages of my invention are the following:

1. The solvent stream is dispersed near its withdrawal end of the extractor, which exposes maximum solvent surface and permits maximum saturation or efficiency of the solvent. Similarly, the material to be extracted is dispersed in the portion of the extractor adjacent to its withdrawal point, which exposes maximum extractable surface and permits maximum cleanup or degree of extraction of the components which it is desired to extract. Conversely, the solvent is the continuous phase at that point in the system where it is the least saturated, and the material to be extracted is the continuous phase in that region where it has the highest concentration of extractable material. The above principles obviously contribute to both maximum efficiency of the solvent and maximum percentage removal of extractable material in a given number of extraction stages.

2. A lower quantity of solvent is required for a given amount of undesired material removed and where the solvent withdrawn through line 42 is recycled for further use, as of course it would be in commercial operation, the amount of solvent recycled would be from 10 to 30% less than in the normal solvent treating process, where the solvent is the continuous phase as it leaves the extraction tower.

It will be understood that my invention embraces solvent treating when the solvent is the lighter or of lower density than the material to be treated in which case the extract would be withdrawn through 40 while the raffinate would be withdrawn through 42 in the drawing.

Many modifications of my invention will readily suggest themselves to those who are familiar with this art.

What I claim is:

1. The method of solvent-treating a liquid mixture of components selectively to dissolve out of the mixture at least one component thereof which comprises causing said liquid mixture to contact a selective liquid solvent in an elongated vertical treating zone, by forcing the solvent into one end of the treating zone as a continuous phase, simultaneously forcing the liquid material to be treated into the other end of the treating zone as a continuous phase, the solvent and material to be treated being of different densities, permitting the solvent and liquid material to flow countercurrently to each other in the treating zone, and controlling the flow rate of liquids and liquid levels in the treating zone so as to cause the solvent to be the disperse phase at the end of the treating zone furthest removed from its point of introduction therein and similarly causing by the same means the liquid to be treated to be the disperse phase at the end of the treating zone furthest removed from its point of introduction.

2. The method of claim 1 in which the solvent is the liquid of higher density and is introduced into the top of the treating zone.

3. The method specified in claim 1 in which the solvent is liquefied $SO_2$ and the liquid material to be treated is a hydrocarbon oil, the solvent being introduced into the top of the treating zone and the hydrocarbon oil being introduced into the bottom of the tower.

4. The method of claim 1 in which the solvent is the continuous phase in the portion of the treating zone nearest its point of introduction and thereafter undergoes phase reversal at near the vertical middle of the treating zone to become the disperse phase in the portion of the treating zone nearest its point of withdrawal.

5. In the solvent extraction of a liquid mixture containing a plurality of components with a liquid solvent having a selective solubility for some certain compounds but being substantially immiscible with said mixture the improvement which comprises introducing the said liquid mixture and the solvent, respectively, into opposite end sections of a vertical extraction tower, so that the heavier liquid is introduced into the upper section and forms a continuous phase therein and the lighter liquid is introduced into the lower section and forms a continuous phase therein, causing the two liquids to flow countercurrently in said extraction tower, interrupting the free flow of the liquids in said tower at an intermediate point, adjusting the rate of flow of the liquids within said upper and lower sections and across said point of interruption so that the heavier liquid forms a dispersed phase in the lower section and the lighter liquid forms a dispersed phase in the upper section, and withdrawing the lighter liquid phase from the top and the heavier liquid phase from the bottom of said tower.

DANIEL E. STINES.